(12) United States Patent
Keller

(10) Patent No.: US 12,441,511 B2
(45) Date of Patent: Oct. 14, 2025

(54) EPOXY CONTAINER DEVICE

(71) Applicant: Brian Keller, Mandan, ND (US)

(72) Inventor: Brian Keller, Mandan, ND (US)

( * ) Notice: Subject to any disclaimer, the term of this patent is extended or adjusted under 35 U.S.C. 154(b) by 49 days.

(21) Appl. No.: 18/437,841

(22) Filed: Feb. 9, 2024

(65) Prior Publication Data

US 2025/0256886 A1    Aug. 14, 2025

(51) Int. Cl.
*B65D 6/24* (2006.01)
*B65D 8/00* (2006.01)
*B65D 25/32* (2006.01)

(52) U.S. Cl.
CPC .......... *B65D 11/1866* (2013.01); *B65D 11/02* (2013.01); *B65D 25/32* (2013.01)

(58) Field of Classification Search
CPC .... B65D 11/1866; B65D 11/02; B65D 25/32; B65D 5/30; B65D 7/00; B65D 2251/1083; B65D 2519/00273; B65D 2519/00641; B65D 2565/386; Y10T 428/1352; Y10T 29/49893
See application file for complete search history.

(56) References Cited

U.S. PATENT DOCUMENTS

| | | | |
|---|---|---|---|
| 3,204,866 A | 9/1965 | Etal | |
| 4,054,225 A | 10/1977 | Frech | |
| 4,216,622 A * | 8/1980 | Hollenbach | A01G 2/20 47/73 |
| 5,232,120 A * | 8/1993 | Dunken | B65D 21/0219 206/508 |
| 5,662,249 A | 9/1997 | Grosse | |
| 6,276,547 B1 | 8/2001 | Petryna | |
| D554,229 S | 10/2007 | Starr | |
| 9,038,312 B2 * | 5/2015 | Harbaugh | A01G 9/02 47/65.5 |
| 9,555,959 B1 * | 1/2017 | Ziegs | B65D 88/005 |
| 10,040,598 B2 * | 8/2018 | Woodlock | A47J 47/02 |
| 10,573,422 B2 * | 2/2020 | Delage | G21F 5/12 |
| 11,547,109 B2 * | 1/2023 | Lardie | A01M 21/043 |
| 2006/0283852 A1 * | 12/2006 | Greiner | B65F 1/06 220/4.22 |
| 2010/0084362 A1 | 4/2010 | Letchinger | |
| 2023/0175879 A1 | 6/2023 | Guilford | |

FOREIGN PATENT DOCUMENTS

WO    WO2012072661    6/2012

* cited by examiner

Primary Examiner — Shawn M Braden

(57) ABSTRACT

An epoxy container device includes a bucket for containing a liquid epoxy. The bucket is vertically divided to define a first half of the bucket removably attachable to a second half of the bucket. The first half is separable from the second half to enhance removing the liquid epoxy from the bucket when the liquid epoxy has hardened. A plurality of first ribs is each attached to the first half of the bucket to reinforce the first half. A plurality of second ribs is each attached to the second half of the bucket to reinforce the second half. A base is removably attachable to the bucket when the first half and the second half are joined together and a handle is removably attachable to the bucket thereby facilitating the bucket to be carried.

16 Claims, 10 Drawing Sheets

EPOXY CONTAINER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to container devices and more particularly pertains to a new epoxy device for mixing a two part epoxy and facilitating the two part epoxy to be easily discarded when the two part epoxy has hardened. The device includes a bucket that is vertically divided into a first half that is removably attachable to a second half and a base that is removably attachable to the first half and the second half when the first half and the second half are joined. The device includes a handle that is attachable to the bucket when first half and the second half are joined.

(2) Description of Related Art Including Information Disclosed Under 37 CFR 1.97 and 1.98

The prior art relates to container devices including a refuse box device that has a door for removing a refuse container from the refuse box and a refuse container device that has a split for widening the refuse container device and a variety of container devices that each at least includes a base portion that is threadably attachable to a container portion and a bucket device that has a graduated scale applied to an interior surface of the bucket device for measuring the volume of contents of the bucket device. In no instance does the prior art disclose a container device that comprises a bucket that is vertically divided into a first half and a second half that are removably attachable together and a base that is removably attachable to the first half and the second half thereby facilitating a hardened two part epoxy to be easily removed from the first half and the second half.

BRIEF SUMMARY OF THE INVENTION

An embodiment of the disclosure meets the needs presented above by generally comprising a bucket for containing a liquid epoxy. The bucket is vertically divided to define a first half of the bucket removably attachable to a second half of the bucket. The first half is separable from the second half to enhance removing the liquid epoxy from the bucket when the liquid epoxy has hardened. A plurality of first ribs is each attached to the first half of the bucket to reinforce the first half.

A plurality of second ribs is each attached to the second half of the bucket to reinforce the second half. A base is removably attachable to the bucket when the first half and the second half are joined together and a handle is removably attachable to the bucket thereby facilitating the bucket to be carried.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
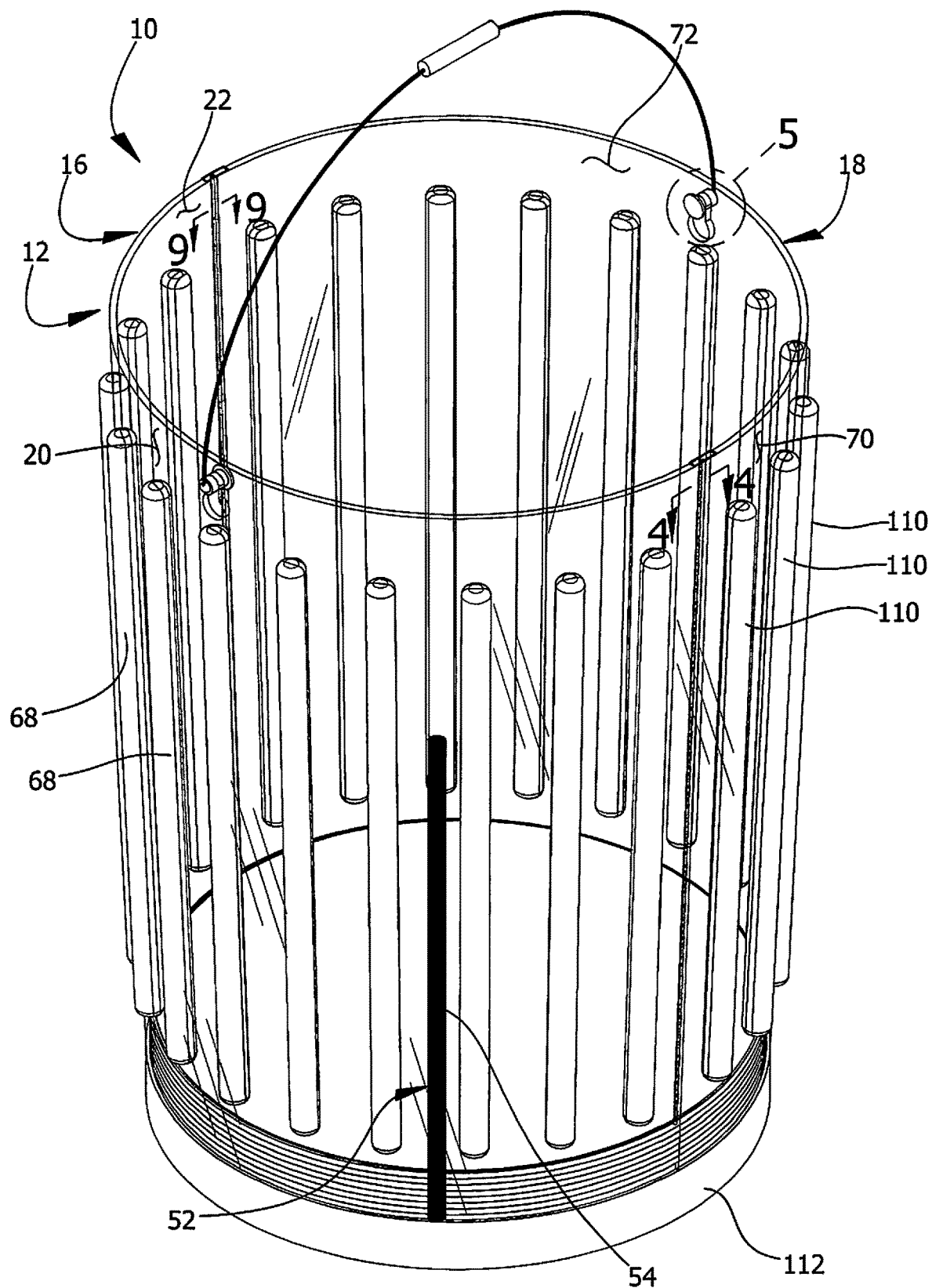
FIG. 1 is a perspective view of an epoxy container device according to an embodiment of the disclosure.
Figure 2:
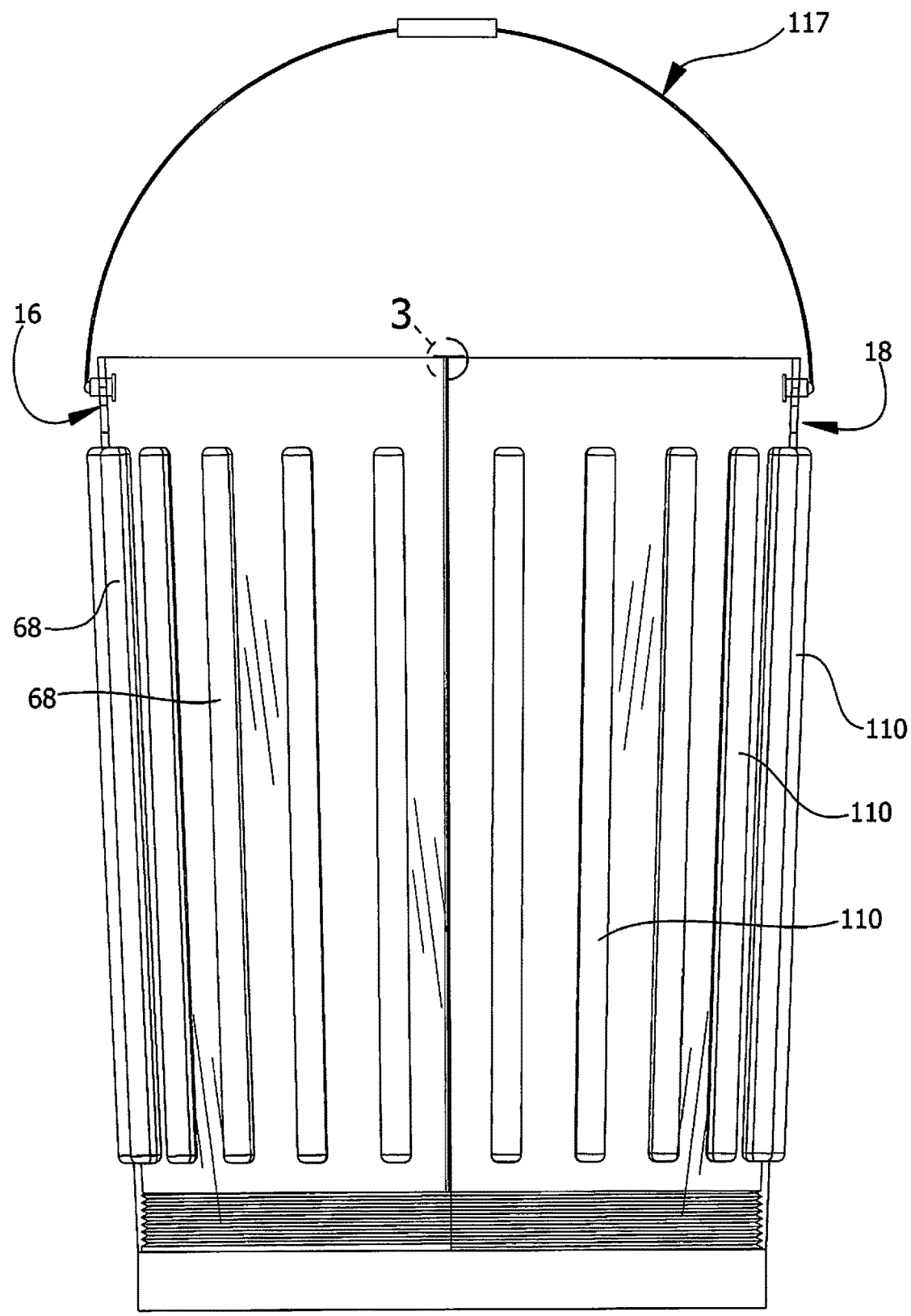
FIG. 2 is a front view of an embodiment of the disclosure.
Figure 3:
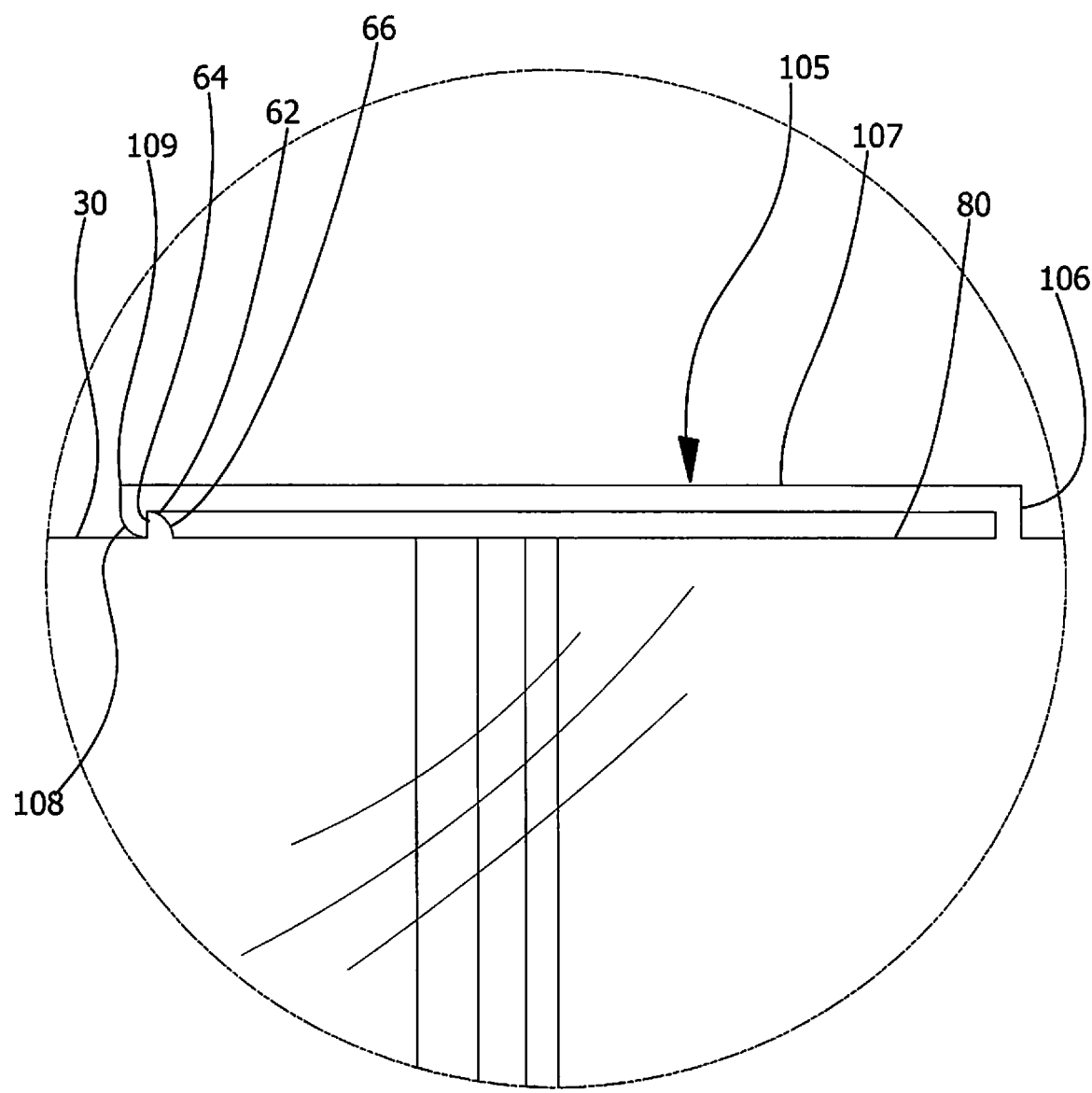
FIG. 3 is a magnified detail view taken from circle 3 of FIG. 2 of an embodiment of the disclosure.
Figure 4:
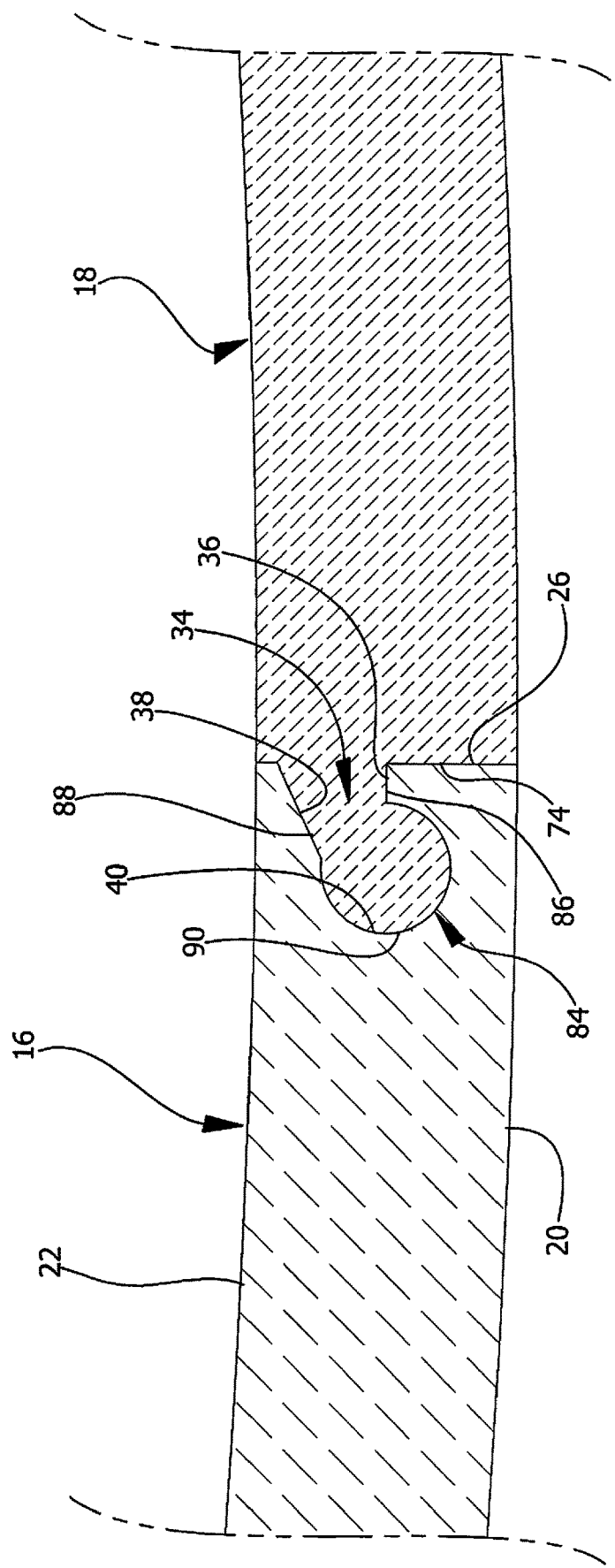
FIG. 4 is a cross sectional view taken along line 4-4 of FIG. 2 of an embodiment of the disclosure.
Figure 5:
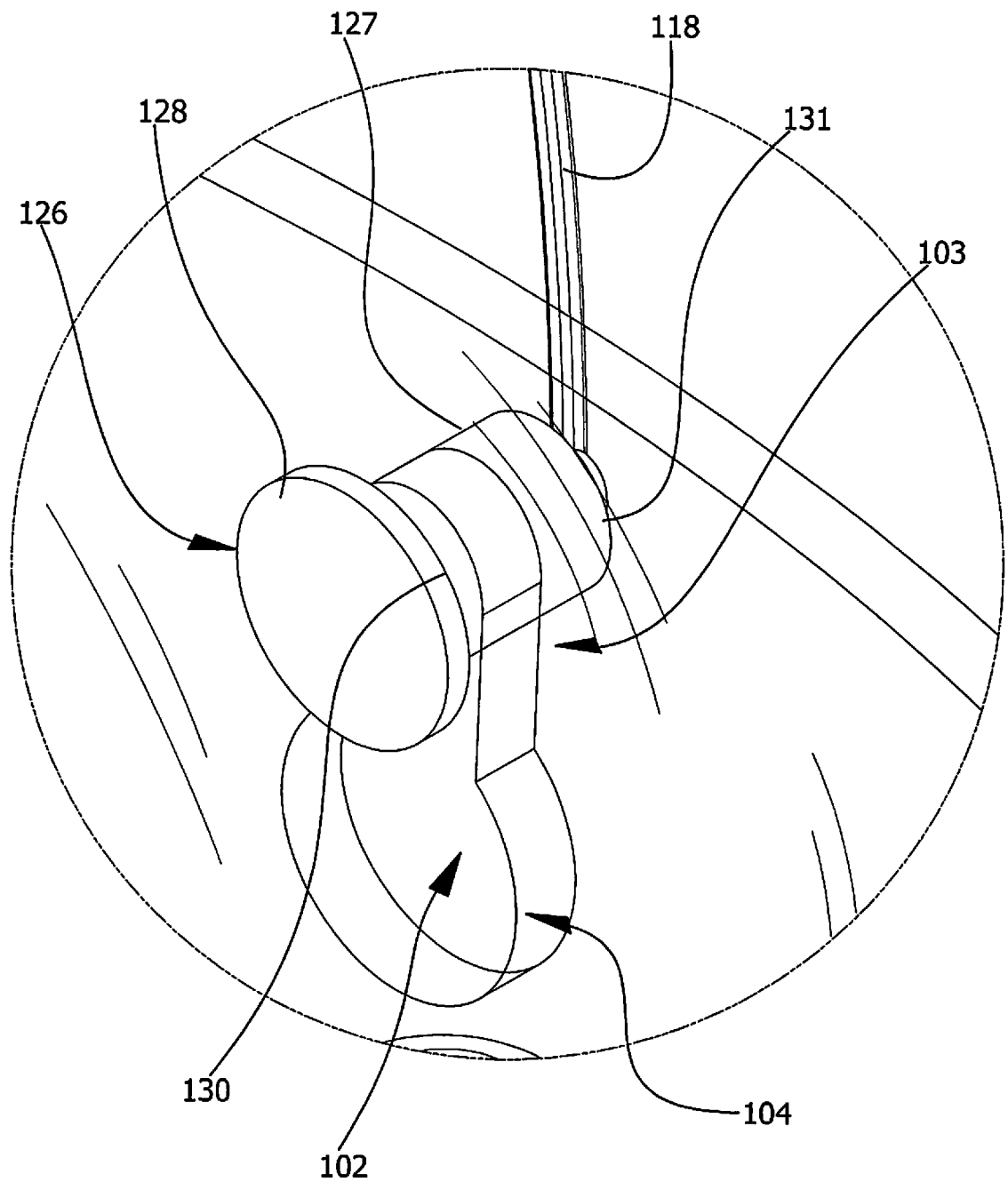
FIG. 5 is a magnified detail view taken from circle 5 of FIG. 1 of an embodiment of the disclosure.
Figure 6:
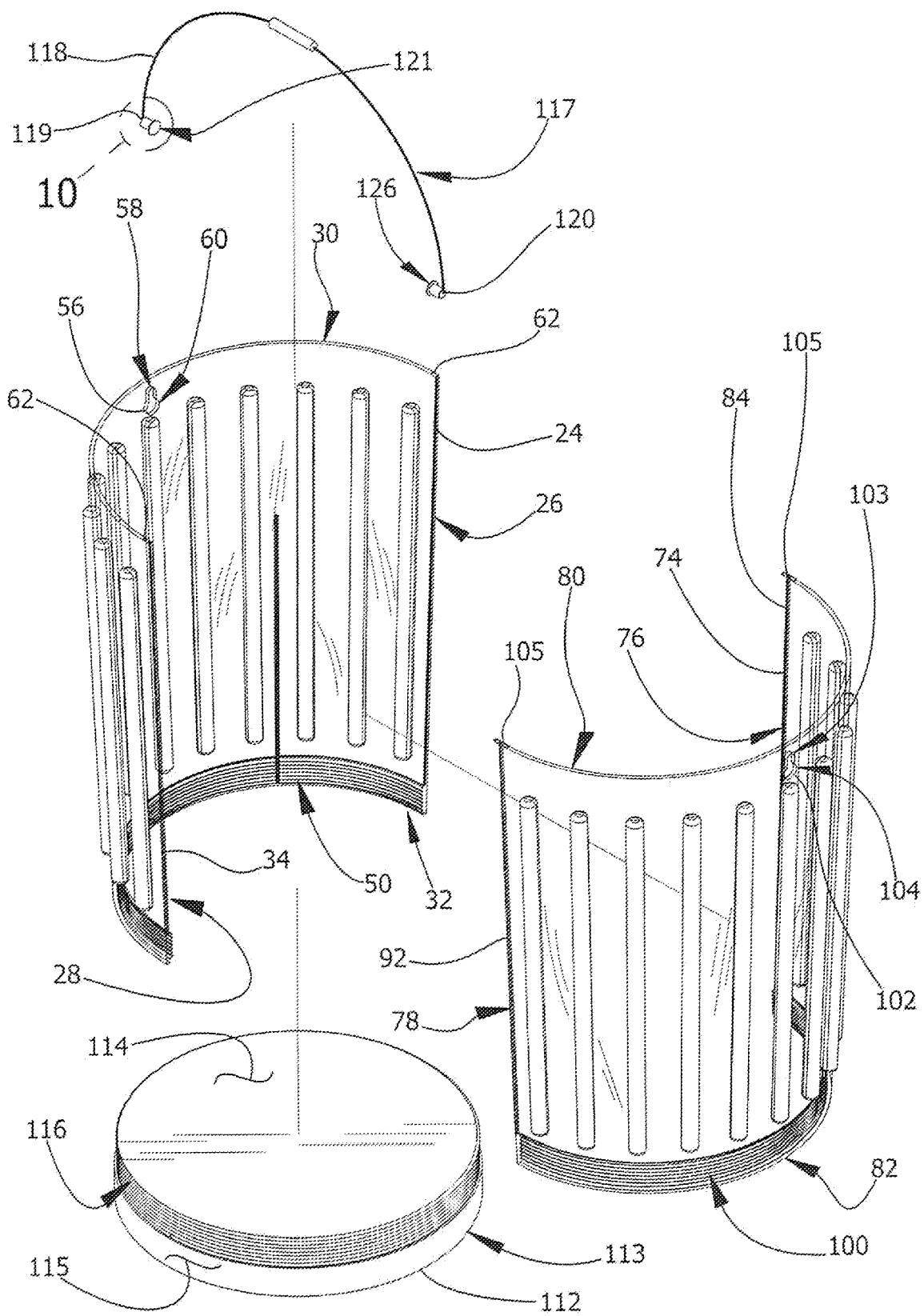
FIG. 6 is an exploded perspective view of an embodiment of the disclosure.
Figure 7:
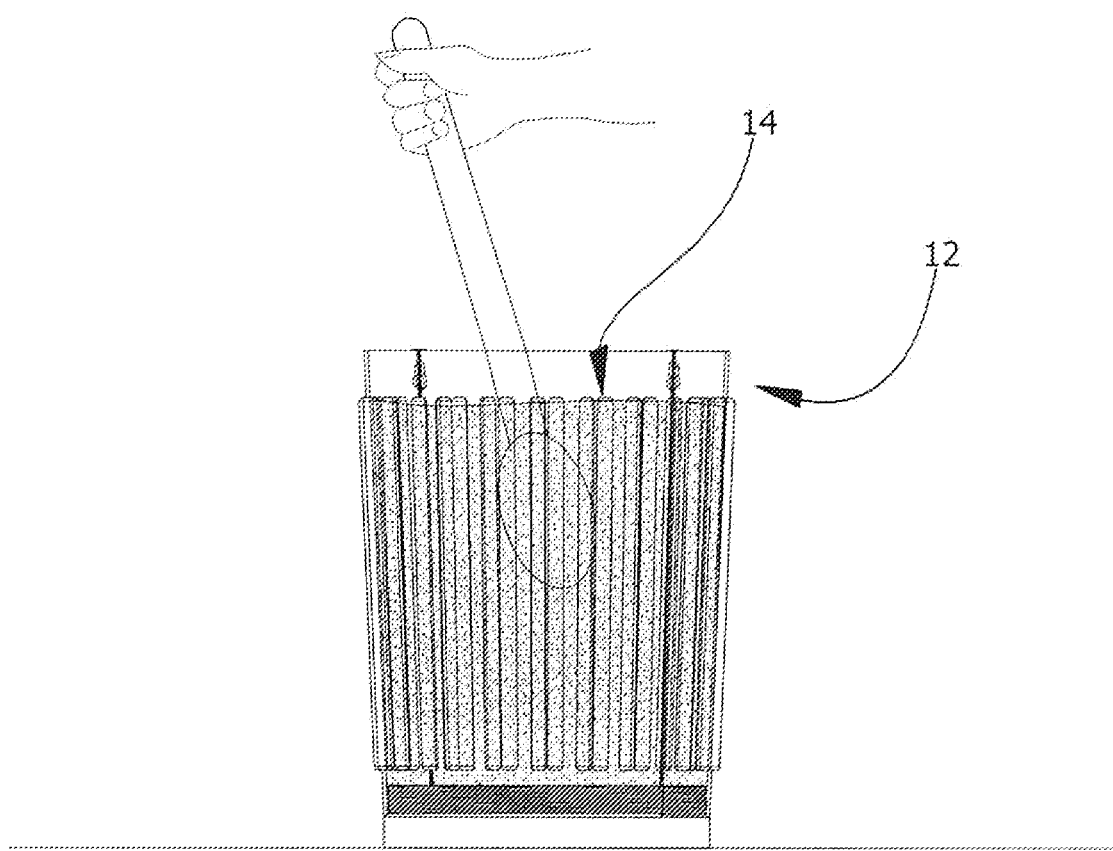
FIG. 7 is a perspective in-use view of an embodiment of the disclosure showing a two part epoxy being mixed in a bucket.
Figure 8:
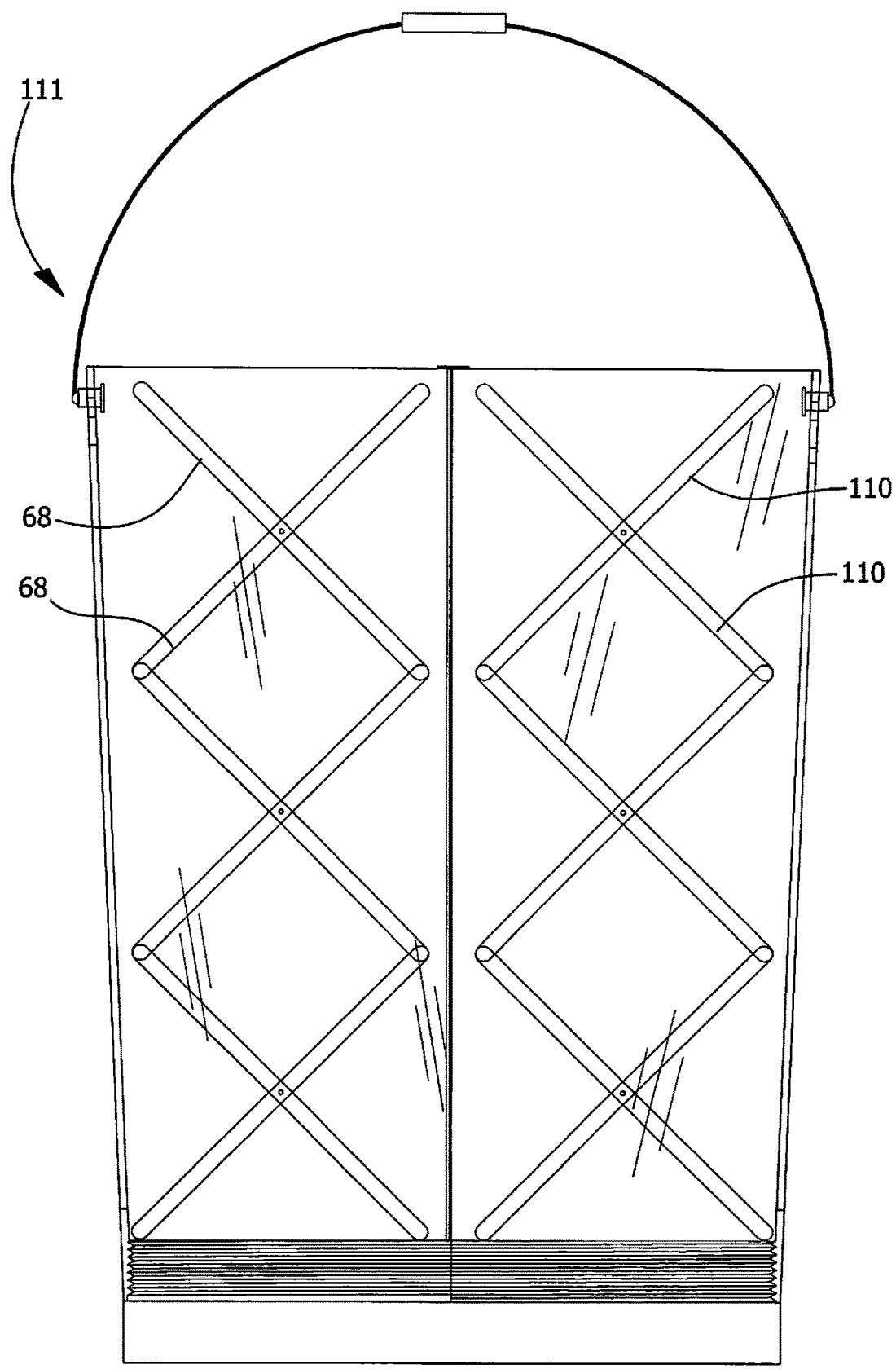
FIG. 8 is a perspective view of an alternative embodiment of the disclosure.
Figure 9:
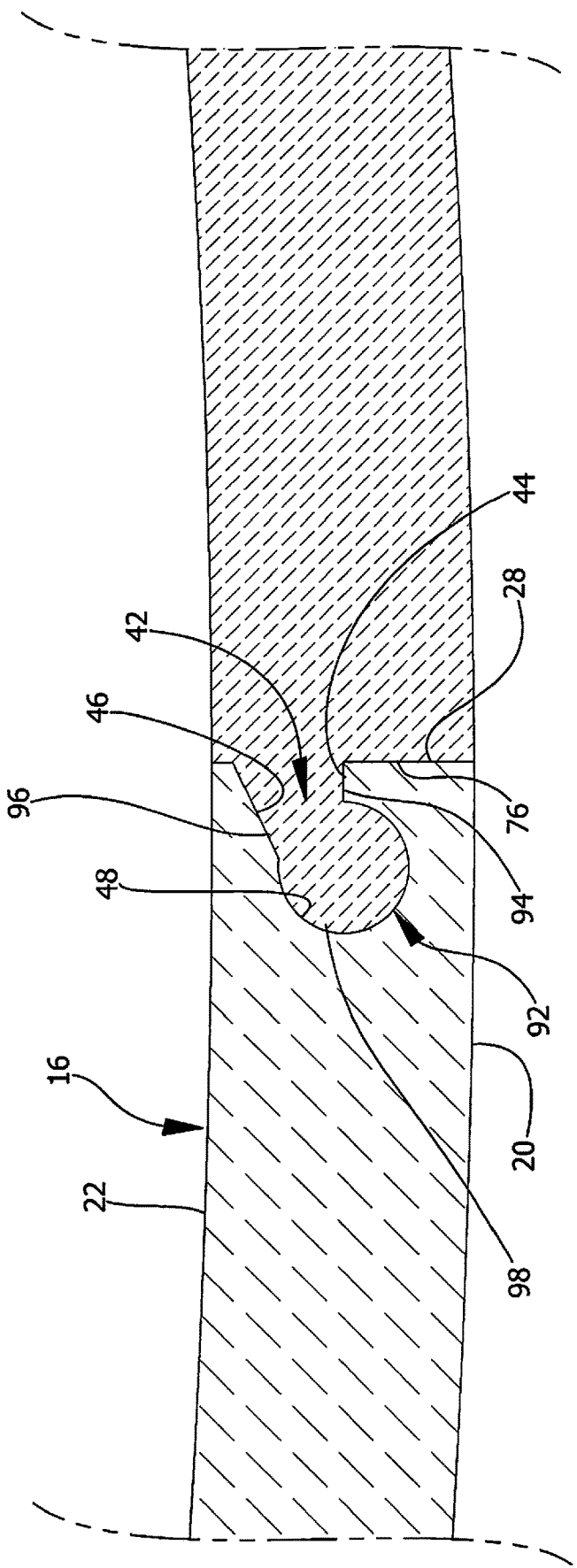
FIG. 9 is a cross sectional view taken along line 9-9 of FIG. 1 of an embodiment of the disclosure.
Figure 10:
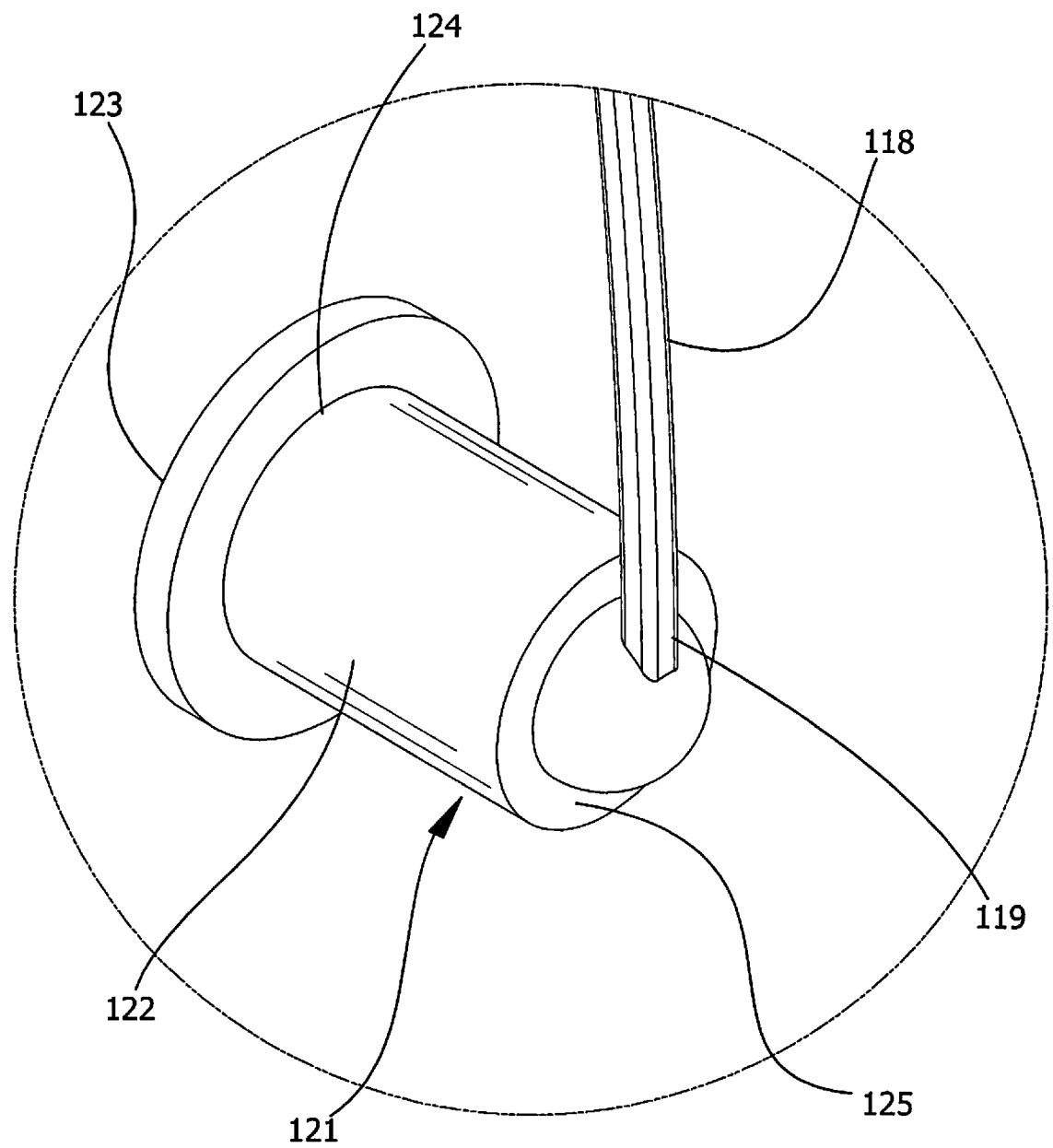
FIG. 10 is a magnified detail view taken from circle 10 of FIG. 6 of an embodiment of the disclosure.

With reference now to the drawings, and in particular to FIGS. 1 through 10 thereof, a new epoxy device embodying the principles and concepts of an embodiment of the disclosure and generally designated by the reference numeral 10 will be described.

As best illustrated in FIGS. 1 through 10, the epoxy container device 10 generally comprises a bucket 12 which is comprised of a fluid impermeable material to contain a liquid epoxy 14. The bucket 12 is vertically divided to define a first half 16 of the bucket 12 that is removably attachable to a second half 18 of the bucket 12. Additionally, the first half 16 is separable from the second half 18 to enhance removing the liquid epoxy 14 from the bucket 12 when the liquid epoxy 14 has hardened. In this way the hardened two part epoxy 14 does not have to be manually chipped or scraped or otherwise laboriously removed as would be the case with a conventional bucket. The liquid epoxy 14 may comprise a two part epoxy or other similar type of compound that typically hardens into a translucent solid.

Each of the first half 16 and the second half 18 is comprised of a translucent material, including but not being limited to polycarbonate or plastic, such that light can pass through the first half 16 and the second half 18 thereby facilitating the liquid epoxy 14 to be visible through the first half 16 and the second half 18. The first half 16 has an outer surface 20, an inner surface 22 and a perimeter edge 24 extending between the outer surface 20 and the inner surface 22 and the perimeter edge 24 has a first lateral side 26, a second lateral side 28, a top side 30 and a bottom side 32. Additionally, the inner surface 22 is concavely arcuate between the first lateral side 26 and the second lateral side 28.

The first lateral side 26 has a first groove 34 extending into the first lateral side 26 and the first groove 34 extends between the top side 30 and the bottom side 32. The first groove 34 has a first bounding surface 36, a second bounding surface 38 and a third bounding surface 40. Each of the first bounding surface 36 and the second bounding surface 38 intersects the first lateral side 26. Furthermore, the first bounding surface 36 is perpendicular to the first lateral side 26 and the second bounding surface 38 is oriented at an obtuse angle with the first lateral side 26 such that the second bounding surface 38 slopes toward the first bounding surface 36. The third bounding surface 40 extends between the first bounding surface 36 and the second bounding surface 38. Additionally, the third bounding surface 40 is concavely arcuate with respect to the first lateral side 26 such that the third bounding surface 40 defines a circular shape.

The second lateral side 28 has a second groove 42 extending into the second lateral side 28 and the second groove 42 extends between the top side 30 and the bottom side 32. The second groove 42 has a primary bounding surface 44, a secondary bounding surface 46 and a tertiary bounding surface 48 and each of the primary bounding surface 44 and the secondary bounding surface 46 of the second groove 42 intersects the second lateral side 28. Additionally, the primary bounding surface 44 of the second groove 42 is perpendicular to the second lateral side 28 and the secondary bounding surface 46 of the second groove 42 is oriented at an obtuse angle with the second lateral side 28 such that the secondary bounding surface 46 of the second groove 42 slopes toward the primary bounding surface 44 of the second groove 42. The tertiary bounding surface 48 of the second groove 42 extends between the primary bounding surface 44 and the secondary bounding surface 46 of the second groove 42. Furthermore, the tertiary bounding surface 48 of the second groove 42 is concavely arcuate with respect to the second lateral side 28 such that the tertiary bounding surface 48 of the second groove 42 defines a circular shape.

The inner surface 22 of the first half 16 has a threaded portion 50 that is located adjacent to the bottom side 32 and which extends between the first lateral side 26 and the second lateral side 28. The first half 16 has indicia 52 that is applied to the outer surface 20 of the first half 16. The indicia 52 comprise a line 54 extending from the bottom side 32 of the perimeter edge 24 toward the top side 30 of the perimeter edge 24. In this way the line 54 facilitates the volume of the liquid epoxy 14 to be measured when the liquid epoxy 14 is poured into the bucket 12.

The first half 16 has a first hole 56 extending through the inner surface 22 and the outer surface 20 and the first hole 56 is centrally located between the first lateral side 26 and the second lateral side 28. The first hole 56 is spaced downwardly from the top side 30 and the first hole 56 has an upper portion 58 which has a diameter that is less than a diameter of a lower portion 60. The first half 16 has a pair of tabs 62 each extending upwardly from the top side 30 and each of the pair of tabs 62 is aligned with a respective one of the first lateral side 26 and the second lateral side 28. Additionally, each of the pair of tabs 62 has a first surface 64 that is perpendicularly oriented with the top side 30 and a second surface 66 curving outwardly between the first surface 64 and the top side 30.

A plurality of first ribs 68 is each attached to the first half 16 of the bucket 12 thereby facilitating each of the plurality of first ribs 68 to reinforce the first half 16. Each of the plurality of first ribs 68 is applied to the outer surface 20 of the first half 16. Furthermore, each of the plurality of first ribs 68 is elongated to extend substantially between the top side 30 and the bottom side 32. The plurality of first ribs 68 is evenly spaced apart from each other and is distributed between the first lateral side 26 and the second lateral side 28.

The second half 18 has an outer surface 70, an inner surface 72 and a perimeter edge 74 extending between the outer surface 70 and the inner surface 72 of the second half 18. The perimeter edge 74 of the second half 18 has a first sidelong side 76, a second sidelong side 78, an upper side 80 and a lower side 82. The inner surface 22 is concavely arcuate between the first sidelong side 76 and the second sidelong side 78 and the first sidelong side 76 has a first knob 84 extending away from the first sidelong side 76. The first knob 84 extends between the upper side 80 and the lower side 82 and the first knob 84 has a primary surface 86, a secondary surface 88 and a tertiary surface 90. Each of the primary surface 86 and the secondary surface 88 intersects the first sidelong side 76. The primary surface 86 is perpendicular to the first sidelong side 76 and the secondary surface 88 is oriented at an obtuse angle with the first sidelong side 76 such that the secondary surface 88 slopes toward the primary surface 86. Additionally, the tertiary surface 90 extends between the primary surface 86 and the secondary surface 88 and the tertiary surface 90 is concavely arcuate with respect to the first sidelong side 76 such that the tertiary surface 90 defines a circular shape. The first knob 84 slides downwardly into the first groove 34 such that the first knob 84 conforms to the shape of first groove 34 thereby inhibiting the first lateral side 26 from being uncoupled from the first sidelong side 76.

The second sidelong side 78 has a second knob 92 extending away from the second sidelong side 78 and the second knob 92 extends between the upper side 80 and the lower side 82. The second knob 92 has a first surface 94, a second surface 96 and a third surface 98. Each of the first surface 94 and the second surface 96 of the second knob 92 intersects the second sidelong side 78. The first surface 94 of the second knob 92 is perpendicular to the second sidelong side 78 and the second surface 96 of the second knob 92 is oriented at an obtuse angle with the second sidelong side 78 of the second knob 92 such that the second surface 96 of the second knob 92 slopes toward the first surface 94 of the second knob 92. The third surface 98 of the second knob 92 extends between the first surface 94 and the second surface 96 of the second knob 92. The third surface 98 of the second knob 92 is concavely arcuate with respect to the second sidelong side 78 such that the third surface 98 of the second knob 92 defines a circular shape. Additionally, the second knob 92 slides downwardly into the second groove 42 such that the second knob 92 conforms to the shape of second groove 42 thereby inhibiting the second lateral side 28 from being uncoupled from the second sidelong side 78.

The inner surface 72 of the second half 18 has a threaded portion 100 that is located adjacent to the lower side 82 and extends between the first sidelong side 76 and the second sidelong side 78. The second half 18 has a second hole 102 extending through the inner surface 22 and the outer surface 20 and the second hole 102 is centrally located between the first sidelong side 76 and the second sidelong side 78. The second hole 102 is spaced downwardly from the upper side 80 and the second hole 102 has a top portion 103 which has a diameter that is less than a diameter of a bottom portion 104.

The second half 18 has a pair of grips 105 each comprising a leg 106 extending upwardly from the upper side 80 and a foot 107 being spaced from and extending along the upper side 80 and a finger 108 extending downwardly from a distal end 109 of the leg 106. Each of the pair of grips 105 is aligned with a respective one of the first sidelong side 76 and the second sidelong side 78. The finger 108 of each of the grips 105 rests against the first surface 64 of a respective one of the pair of tabs 62 on the first half 16 when the second half 18 is attached to the first half 16 for inhibiting the first half 16 from separating from the second half 18.

A plurality of second ribs 110 is each attached to the second half 18 of the bucket 12 thereby facilitating each of the plurality of second ribs 110 to reinforce the second half 18. Each of the plurality of second ribs 110 is applied to the outer surface 20 of the second half 18 and each of the plurality of second ribs 110 is elongated to extend substantially between the upper side 80 and the lower side 82. The second ribs 110 are evenly spaced apart from each other and are distributed between the first sidelong side 76 and the second sidelong side 78. In an alternative embodiment 111 as is most clearly shown in FIG. 8, each of the first ribs 68 may be oriented to intersect with each other to form a lattice and each of the second ribs 110 may be oriented to intersect with each other to form a lattice.

A base 112 is removably attachable to the bucket 12 when the first half 16 and the second half 18 are joined together. The base 112 has a bottom surface 113, a top surface 114 and a perimeter surface 115 extending between the bottom surface 113 and the top surface 114; the perimeter surface 115 has a threaded portion 116 extending around a full circumference of the perimeter surface 115 and the threaded portion 116 extends from the top surface 114 toward the bottom surface 113. Furthermore, the threaded portion 50 of the first half 16 and the threaded portion 100 of the second half 18 threadably engages the threaded portion 116 of the base 112 for securing the bucket 12 to the base 112.

A handle 117 is removably attachable to the bucket 12 thereby facilitating the bucket 12 to be carried. The handle 117 comprises a member 118 which has a first end 119 and a second end 120 and the member 118 is curved between the first end 119 and the second end 120. The handle 117 includes a first coupler 121 that has a cylindrical portion 122 and a disk portion 123 which lies flat on a front end 124 of the cylindrical portion 122. The member 118 is pivotally coupled to a back end 125 of the cylindrical portion 122 at a point located adjacent to the first end 119 of the member 118. The disk portion 123 has a diameter that is greater than a diameter of the cylindrical portion 122.

The disk portion 123 is insertable through the lower portion 60 of the first hole 56 in the first half 16 of the bucket 12 thereby facilitating the cylindrical portion 122 to be urged upwardly into the upper portion 58 of the first hole 56. In this way the disk portion 123 is inhibited from passing through the upper portion 58 of the first hole 56 for securing the first coupler 121 in the first hole 56. The handle 117 includes a second coupler 126 which has a cylindrical portion 127 and a disk portion 128 that lies flat on a front end 130 of the cylindrical portion 127 of the second coupler 126. The member 118 is pivotally coupled to a back end 131 of the cylindrical portion 122 at a point located adjacent to the second end 120 of the member 118. The disk portion 128 of the second coupler 126 has a diameter that is greater than a diameter of the cylindrical portion 127 of the second coupler 126. Additionally, the disk portion 128 of the second coupler 126 is insertable through the lower portion 60 of the second hole 102 in the second half 18 of the bucket 12 thereby facilitating the cylindrical portion 127 of the second coupler 126 to be urged upwardly into the upper portion 58 of the second hole 102. In this way the disk portion 128 of the second coupler 126 is inhibited from passing through the upper portion 58 of the second hole 102 for securing the second coupler 126 in the second hole 102.

In use, the first half 16 is attached to the second half 18 and the base 112 is attached to each of the first half 16 and the second half 18 thereby defining the bucket 12. The liquid epoxy 14 is poured into the bucket 12 to mix the liquid epoxy 14 prior to employing the liquid epoxy 14. The base 112 is removed from the first half 16 and the second half 18 and the first half 16 is removed from the second half 18 when the liquid epoxy 14 has hardened in the bucket 12. In this way the bucket 12 is removed from the hardened liquid epoxy 14 rather than engaging in the laborious endeavor of removing the hardened liquid epoxy 14 from the bucket 12. Additionally, the handle 117 can be attached to the bucket 12 to facilitate carrying the bucket 12 and the handle 117 can be removed from the bucket 12 prior to removing the first half 16 from the second half 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An epoxy container device for breaking into two halves thereby facilitating epoxy that has hardened to be discarded, said device comprising:
  a bucket being comprised of a fluid impermeable material wherein said bucket is configured to contain a liquid epoxy, said bucket being vertically divided to define a first half of said bucket being removably attachable to a second half of said bucket, said first half being separable from said second half wherein said bucket is configured to enhance removing the liquid epoxy from said bucket when the liquid epoxy has hardened, each of said first half and said second half being comprised of a translucent material wherein said first half and said second half are configured to pass light thereby facilitating the liquid epoxy to be visible through said first half and said second half;
  a plurality of first ribs, each of said plurality of first ribs being attached to said first half of said bucket thereby facilitating each of said plurality of first ribs to reinforce said first half;
  a plurality of second ribs, each of said plurality of second ribs being attached to said second half of said bucket thereby facilitating each of said plurality of second ribs to reinforce said second half;
  a base being removably attachable to said bucket when said first half and said second half are joined together;
  a handle being removably attachable to said bucket thereby facilitating said bucket to be carried;
  wherein said first half has an outer surface and an inner surface and a perimeter edge extending between said outer surface and said inner surface;
  wherein said perimeter edge has a first lateral side and a second lateral side and a top side and a bottom side;
  wherein said inner surface is concavely arcuate between said first lateral side and said second lateral side;
  wherein said first lateral side has a first groove extending into said first lateral side;
  wherein said first groove extends between said top side and said bottom side;
  wherein said second lateral side has a second groove extending into said second lateral side;
  wherein said second groove extends between said top side and said bottom side;
  wherein said inner surface has a threaded portion being located adjacent to said bottom side and extending between said first lateral side and said second lateral side;
  wherein said first half has indicia being applied to said outer of said first half; and
  wherein said indicia comprise a line extending from said bottom side of said perimeter edge toward said top side of said perimeter edge wherein said line is configured to facilitate the volume of the liquid epoxy to be measured when the liquid epoxy is poured into said bucket.

2. The assembly according to claim 1, wherein:
  said first groove has a first bounding surface and a second bounding surface and a third bounding surface;
  each of said first bounding surface and said second bounding surface intersects said first lateral side;
  said first bounding surface is perpendicular to said first lateral side;
  said second bounding surface is oriented at an obtuse angle with said first lateral side such that said second bounding surface slopes toward said first bounding surface;
  said third bounding surface extends between said first bounding surface and said second bounding surface; and
  said third bounding surface is concavely arcuate with respect to said first lateral side such that said third bounding surface defines a circular shape.

3. The assembly according to claim 1, wherein:
  said second groove has a primary bounding surface and a secondary bounding surface and a tertiary bounding surface;
  each of said primary bounding surface and said secondary bounding surface of said second groove intersects said second lateral side;
  said primary bounding surface of said second groove is perpendicular to said second lateral side;
  said secondary bounding surface of said second groove is oriented at an obtuse angle with said second lateral side such that said secondary bounding surface of said second groove slopes toward said primary bounding surface of said second groove;
  said tertiary bounding surface of said second groove extends between said primary bounding surface and said secondary bounding surface of said second groove;
  said tertiary bounding surface of said second groove is concavely arcuate with respect to said second lateral side such that said tertiary bounding surface of said second groove defines a circular shape.

4. The assembly according to claim 1, wherein:
  said first half has a first hole extending through said inner surface and said outer surface;
  said first hole is centrally located between said first lateral side and said second lateral side;
  said first hole is spaced downwardly from said top side; and
  said first hole has an upper portion having a diameter being less than a diameter of a lower portion.

5. The assembly according to claim 1, wherein:
  said first half has a pair of tabs each extending upwardly from said top side;
  each of said pair of tabs is aligned with a respective one of said first lateral side and said second lateral side; and
  each of said pair of tabs has a first surface being perpendicularly oriented with said top side and a second surface curving outwardly between said first surface and said top side.

6. The assembly according to claim 1, wherein:
  each of said plurality of first ribs is applied to said outer surface of said first half;
  each of said plurality of first ribs is elongated to extend substantially between said top side and said bottom side; and
  said plurality of first ribs is evenly spaced apart from each other and is distributed between said first lateral side and said second lateral side.

7. An epoxy container device for breaking into two halves thereby facilitating epoxy that has hardened to be discarded, said device comprising:
  a bucket being comprised of a fluid impermeable material wherein said bucket is configured to contain a liquid epoxy, said bucket being vertically divided to define a first half of said bucket being removably attachable to a second half of said bucket, said first half being separable from said second half wherein said bucket is configured to enhance removing the liquid epoxy from said bucket when the liquid epoxy has hardened, each of said first half and said second half being comprised of a translucent material wherein said first half and said second half are configured to pass light thereby facilitating the liquid epoxy to be visible through said first half and said second half;

a plurality of first ribs, each of said plurality of first ribs being attached to said first half of said bucket thereby facilitating each of said plurality of first ribs to reinforce said first half;

a plurality of second ribs, each of said plurality of second ribs being attached to said second half of said bucket thereby facilitating each of said plurality of second ribs to reinforce said second half;

a base being removably attachable to said bucket when said first half and said second half are joined together;

a handle being removably attachable to said bucket thereby facilitating said bucket to be carried;

wherein said second half has an outer surface and an inner surface and a perimeter edge extending between said outer surface and said inner surface of said second half;

wherein said perimeter edge of said second half has a first sidelong side and a second sidelong side and an upper side and a lower side;

wherein said inner surface is concavely arcuate between said first sidelong side and said second sidelong side;

wherein said first sidelong side has a first knob extending away from said first sidelong side;

wherein said first knob extends between said upper side and said lower side;

wherein said second sidelong side has a second knob extending away from said second sidelong side; said second knob extends between said upper side and said lower side; and wherein said inner surface of said second half has a threaded portion being located adjacent to said lower side and extending between said first sidelong side and said second sidelong side.

8. The assembly according to claim 7, wherein:

said first half has a first groove extending into a first lateral side of a perimeter edge of said first half;

said first knob has a primary surface and a secondary surface and a tertiary surface;

each of said primary surface and said secondary surface intersects said first sidelong side;

said primary surface is perpendicular to said first sidelong side;

said secondary surface is oriented at an obtuse angle with said first sidelong side such that said secondary surface slopes toward said primary surface;

said tertiary surface extends between said primary surface and said secondary surface;

said tertiary surface is concavely arcuate with respect to said first sidelong side such that said tertiary surface defines a circular shape; and said first knob slides downwardly into said first groove such that said first knob conforms to the shape of first groove thereby inhibiting said first lateral side from being uncoupled from said first sidelong side.

9. The assembly according to claim 7, wherein:

said first half has a first groove extending into a first lateral side of a perimeter edge of said first half;

said first half has a second groove extending into a second lateral side of said perimeter edge of said first half;

said second knob has a first surface and a second surface and a third surface;

each of said first surface and said second surface of said second knob intersects said second sidelong side;

said first surface of said second knob is perpendicular to said second sidelong side;

said second surface of said second knob is oriented at an obtuse angle with said second sidelong side of said second knob such that said second surface of said second knob slopes toward said first surface of said second knob;

said third surface of said second knob extends between said first surface and said second surface of said second knob; and said third surface of said second knob is concavely arcuate with respect to said second sidelong side such that said third surface of said second knob defines a circular shape; and said second knob slides downwardly into said second groove such that said second knob conforms to the shape of second groove thereby inhibiting said second lateral side from being uncoupled from said second sidelong side.

10. The assembly according to claim 7, wherein:

said second half has a second hole extending through said inner surface and said outer surface;

said second hole is centrally located between said first sidelong side and said second sidelong side;

said second hole is spaced downwardly from said upper side; and said second hole has a top portion having a diameter being less than a diameter of a bottom portion.

11. The assembly according to claim 7, wherein:

said first half includes a pair of tabs, each of said tabs having a first surface;

said second half has a pair of grips each comprising a leg extending upwardly from said upper side and a foot being spaced from and extending along said upper side and a finger extending downwardly from a distal end of said leg;

each of said pair of grips is aligned with a respective one of said first sidelong side and said second sidelong side; and said finger of each of said grips rests against said first surface of a respective one of said pair of tabs on said first half when said second half is attached to said first half for inhibiting said first half from separating from said second half.

12. The assembly according to claim 7, wherein:

each of said plurality of second ribs is applied to said outer surface of said second half;

each of said plurality of second ribs is elongated to extend substantially between said upper side and said lower side; and said plurality of second ribs is evenly spaced apart from each other and being distributed between said first sidelong side and said second sidelong side.

13. An epoxy container device for breaking into two halves thereby facilitating epoxy that has hardened to be discarded, said device comprising:

a bucket being comprised of a fluid impermeable material wherein said bucket is configured to contain a liquid epoxy, said bucket being vertically divided to define a first half of said bucket being removably attachable to a second half of said bucket, said first half being separable from said second half wherein said bucket is configured to enhance removing the liquid epoxy from said bucket when the liquid epoxy has hardened, each of said first half and said second half being comprised of a translucent material wherein said first half and said second half are configured to pass light thereby facilitating the liquid epoxy to be visible through said first half and said second half;

a plurality of first ribs, each of said plurality of first ribs being attached to said first half of said bucket thereby facilitating each of said plurality of first ribs to reinforce said first half;

a plurality of second ribs, each of said plurality of second ribs being attached to said second half of said bucket thereby facilitating each of said plurality of second ribs to reinforce said second half;

a base being removably attachable to said bucket when said first half and said second half are joined together;

a handle being removably attachable to said bucket thereby facilitating said bucket to be carried;

wherein said first half has a threaded portion;

wherein said second half has a threaded portion;

wherein said base has a bottom surface and a top surface and a perimeter surface extending between said bottom surface and said top surface;

wherein said perimeter surface has a threaded portion extending around a full circumference of said perimeter surface;

wherein said threaded portion extends from said top surface toward said bottom surface; and wherein said threaded portion of said first half and said threaded portion of said second half threadably engages said threaded portion of said base for securing said bucket to said base.

14. The assembly according to claim 4, wherein said handle comprises:

a member having a first end and a second end, said member being curved between said first end and said second end; and a first coupler having a cylindrical portion and a disk portion lying flat on a front end of said cylindrical portion, said member being pivotally coupled to a back end of said cylindrical portion at a point located adjacent to said first end of said member, said disk portion having a diameter being greater than a diameter of said cylindrical portion, said disk portion being insertable through said lower portion of said first hole in said first half of said bucket thereby facilitating said cylindrical portion to be urged upwardly into said upper portion of said first hole thereby inhibiting said disk from passing through said upper portion of said first hole for securing said first coupler in said first hole.

15. The assembly according to claim 10, wherein said handle comprises:

a member having a first end and a second end and a first coupler, said member being curved between said first end and said second end; and a second coupler having a cylindrical portion and a disk portion lying flat on a front end of said cylindrical portion of said second coupler, said member being pivotally coupled to a back end of said cylindrical portion of said second coupler at a point located adjacent to said second end of said member, said disk portion of said second coupler having a diameter being greater than a diameter of said cylindrical portion of said second coupler, said disk portion of said second coupler being insertable through said lower portion of said second hole in said second half of said bucket thereby facilitating said cylindrical portion of said second coupler to be urged upwardly into said upper portion of said second hole thereby inhibiting said disk of said second coupler from passing through said upper portion of said second hole for securing said second coupler in said second hole.

16. The epoxy container device of claim 7, further comprising:

said first half having an outer surface and an inner surface and a perimeter edge extending between said outer surface and said inner surface, said perimeter edge having a first lateral side and a second lateral side and a top side and a bottom side, said inner surface being concavely arcuate between said first lateral side and said second lateral side, said first lateral side having a first groove extending into said first lateral side, said first groove extending between said top side and said bottom side, said first groove having a first bounding surface and a second bounding surface and a third bounding surface, each of said first bounding surface and said second bounding surface intersecting said first lateral side, said first bounding surface being perpendicular to said first lateral side, said second bounding surface being oriented at an obtuse angle with said first lateral side such that said second bounding surface slopes toward said first bounding surface, said third bounding surface extending between said first bounding surface and said second bounding surface, said third bounding surface being concavely arcuate with respect to said first lateral side such that said third bounding surface defines a circular shape, said second lateral side having a second groove extending into said second lateral side, said second groove extending between said top side and said bottom side, said second groove having a primary bounding surface and a secondary bounding surface and a tertiary bounding surface, each of said primary bounding surface and said secondary bounding surface of said second groove intersects said second lateral side, said primary bounding surface of said second groove being perpendicular to said second lateral side, said secondary bounding surface of said second groove being oriented at an obtuse angle with said second lateral side such that said secondary bounding surface of said second groove slopes toward said primary bounding surface of said second groove, said tertiary bounding surface of said second groove extending between said primary bounding surface and said secondary bounding surface of said second groove, said tertiary bounding surface of said second groove being concavely arcuate with respect to said second lateral side such that said tertiary bounding surface of said second groove defines a circular shape, said inner surface having a threaded portion being located adjacent to said bottom side and extending between said first lateral side and said second lateral side, said first half having indicia being applied to said outer of said first half, said indicia comprising a line extending from said bottom side of said perimeter edge toward said top side of said perimeter edge wherein said line is configured to facilitate the volume of the liquid epoxy to be measured when the liquid epoxy is poured into said bucket, said first half having a first hole extending through said inner surface and said outer surface, said first hole being centrally located between said first lateral side and said second lateral side, said first hole being spaced downwardly from said top side, said first hole having an upper portion having a diameter being less than a diameter of a lower portion, said first half having a pair of tabs each extending upwardly from said top side, each of said pair of tabs being aligned with a respective one of said first lateral side and said second lateral side, each of said pair of tabs having a first surface being perpendicularly oriented with said top side and a second surface curving outwardly between said first surface and said top side;

each of said plurality of first ribs to reinforce said first half, each of said plurality of first ribs being applied to said outer surface of said first half, each of said plurality of first ribs being elongated to extend substantially between said top side and said bottom side, said plurality of first ribs being evenly spaced apart from each other and being distributed between said first lateral side and said second lateral side;

said first knob having a primary surface and a secondary surface and a third surface, each of said primary surface and said secondary surface intersecting said first sidelong side, said primary surface being perpendicular to said first sidelong side, said secondary surface being oriented at an obtuse angle with said first sidelong side such that said secondary surface slopes toward said primary surface, said third surface extending between said primary surface and said secondary surface, said third surface being concavely arcuate with respect to said first sidelong side such that said third surface defines a circular shape, said first knob sliding downwardly into said first groove such that said first knob conforms to the shape of first groove thereby inhibiting said first lateral side from being uncoupled from said first sidelong side, said second knob having a first surface and a second surface and a third surface, each of said first surface and said second surface of said second knob intersecting said second sidelong side, said first surface of said second knob being perpendicular to said second sidelong side, said second surface of said second knob being oriented at an obtuse angle with said second sidelong side of said second knob such that said second surface of said second knob slopes toward said first surface of said second knob, said third surface of said second knob extending between said first surface and said second surface of said second knob, said third surface of said second knob being concavely arcuate with respect to said second sidelong side such that said third surface of said second knob defines a circular shape, said second knob sliding downwardly into said second groove such that said second knob conforms to the shape of second groove thereby inhibiting said second lateral side from being uncoupled from said second sidelong side, said second half having a second hole extending through said inner surface and said outer surface, said second hole being centrally located between said first sidelong side and said second sidelong side, said second hole being spaced downwardly from said upper side, said second hole having a top portion having a diameter being less than a diameter of a bottom portion, said second half having a pair of grips each comprising a leg extending upwardly from said upper side and a foot being spaced from and extending along said upper side and a finger extending downwardly from a distal end of said leg, each of said pair of grips being aligned with a respective one of said first sidelong side and said second sidelong side, said finger of each of said grips resting against said first surface of a respective one of said pair of tabs on said first half when said second half is attached to said first half for inhibiting said first half from separating from said second half;

each of said plurality of second ribs being applied to said outer surface of said second half, each of said plurality of second ribs being elongated to extend substantially between said upper side and said lower side, said plurality of second ribs being evenly spaced apart from each other and being distributed between said first sidelong side and said second sidelong side;

said base having a bottom surface and a top surface and a perimeter surface extending between said bottom surface and said top surface, said perimeter surface having a threaded portion extending around a full circumference of said perimeter surface, said threaded portion extending from said top surface toward said bottom surface, said threaded portion of said first half and said threaded portion of said second half threadably engaging said threaded portion of said base for securing said bucket to said base; and said handle comprising:

a member having a first end and a second end, said member being curved between said first end and said second end;

a first coupler having a cylindrical portion and a disk portion lying flat on a front end of said cylindrical portion, said member being pivotally coupled to a back end of said cylindrical portion at a point located adjacent to said first end of said member, said disk portion having a diameter being greater than a diameter of said cylindrical portion, said disk portion being insertable through said lower portion of said first hole in said first half of said bucket thereby facilitating said cylindrical portion to be urged upwardly into said upper portion of said first hole thereby inhibiting said disk portion from passing through said upper portion of said first hole for securing said first coupler in said first hole; and a second coupler having a cylindrical portion and a disk portion lying flat on a front end of said cylindrical portion of said second coupler, said member being pivotally coupled to a back end of said cylindrical portion of said second coupler at a point located adjacent to said second end of said member, said disk portion of said second coupler having a diameter being greater than a diameter of said cylindrical portion of said second coupler, said disk portion of said second coupler being insertable through said lower portion of said second hole in said second half of said bucket thereby facilitating said cylindrical portion of said second coupler to be urged upwardly into said upper portion of said second hole thereby inhibiting said disk of said second coupler from passing through said upper portion of said second hole for securing said second coupler in said second hole.

\* \* \* \* \*